(12) United States Patent
Zhu et al.

(10) Patent No.: US 10,632,724 B2
(45) Date of Patent: Apr. 28, 2020

(54) PROCESS FOR MANUFACTURING BASE BOARD OF HIGH-SPEED RAIL EQUIPMENT CABIN USING COMPOSITE MATERIAL

(71) Applicant: SHANGHAI CEDAR COMPOSITES TECHNOLOGY CO., LTD., Shanghai (CN)

(72) Inventors: Jiaqiang Zhu, Shanghai (CN); Bin Wang, Shanghai (CN); Sishun Zhang, Shanghai (CN); Ming Wang, Shanghai (CN); Changzhi Xie, Shanghai (CN); Jianlan Luo, Shanghai (CN)

(73) Assignee: SHANGHAI CEDAR COMPOSITES TECHNOLOGY CO., LTD., Shanghai (CN)

( * ) Notice: Subject to any disclaimer, the term of this patent is extended or adjusted under 35 U.S.C. 154(b) by 143 days.

(21) Appl. No.: 16/063,252

(22) PCT Filed: Aug. 23, 2016

(86) PCT No.: PCT/CN2016/096336
§ 371 (c)(1),
(2) Date: Jun. 16, 2018

(87) PCT Pub. No.: WO2017/101492
PCT Pub. Date: Jun. 22, 2017

(65) Prior Publication Data
US 2018/0361686 A1 Dec. 20, 2018

(30) Foreign Application Priority Data

Dec. 16, 2015 (CN) .......................... 2015 1 0947269

(51) Int. Cl.
*B32B 37/14* (2006.01)
*B29C 70/44* (2006.01)
(Continued)

(52) U.S. Cl.
CPC ............ *B32B 37/146* (2013.01); *B29C 70/34* (2013.01); *B29C 70/44* (2013.01); *B29C 70/46* (2013.01);
(Continued)

(58) Field of Classification Search
CPC .... B61D 17/04; B61D 17/041; B61D 17/045; B61D 17/005; B61D 17/06; B61D 17/08;
(Continued)

(56) References Cited

U.S. PATENT DOCUMENTS 3,386,204 A * 6/1968 Obata .................. B61D 19/009
  49/212
6,131,340 A * 10/2000 Clark ...................... B63B 43/24
  114/202

(Continued)

*Primary Examiner* — John L Goff, II

(57) ABSTRACT

A process for manufacturing a base board of a high-speed rail equipment cabin using a composite material is disclosed. The composite material includes: aramid honeycomb, PET foam, 3K twill carbon fiber flame retardant prepreg, unidirectional carbon fiber flame retardant prepreg, glass fiber flame retardant prepreg, aramid flame retardant prepreg, and 300 g/cm² single component medium temperature curing blue epoxy adhesive. The process includes manufacturing a base-board main plate (1), a base-board handle (2) and two base-board sliders (3). While installation, the base-board handle (2) is stuck to one side of the base-board main plate (1), and the two base-board sliders (3) are respectively stuck to another two opposite sides of the base-board main plate (1). The weight of the base board made from the composite material is 35%-40% lower than the base board made from the aluminum alloy material, which leads to a good prospect of application.

6 Claims, 3 Drawing Sheets

(51) Int. Cl.
  *B29C 70/46*   (2006.01)
  *B61C 17/04*   (2006.01)
  *B32B 37/12*   (2006.01)
  *B61D 17/04*   (2006.01)
  *B29C 70/34*   (2006.01)
  *B32B 3/12*    (2006.01)
  *B32B 7/12*    (2006.01)
  *B32B 9/00*    (2006.01)
  *B32B 17/02*   (2006.01)
  *B29L 31/60*   (2006.01)
  *B32B 37/10*   (2006.01)

(52) U.S. Cl.
  CPC ............... *B32B 3/12* (2013.01); *B32B 7/12* (2013.01); *B32B 9/007* (2013.01); *B32B 17/02* (2013.01); *B32B 37/1207* (2013.01); *B61C 17/04* (2013.01); *B61D 17/04* (2013.01); *B61D 17/041* (2013.01); *B61D 17/045* (2013.01); *B29L 2031/608* (2013.01); *B32B 37/10* (2013.01); *B32B 2037/1269* (2013.01); *B32B 2250/05* (2013.01); *B32B 2260/023* (2013.01); *B32B 2262/0269* (2013.01); *B32B 2262/106* (2013.01); *B32B 2307/3065* (2013.01); *B32B 2309/02* (2013.01); *B32B 2309/04* (2013.01); *B32B 2309/12* (2013.01); *B32B 2311/24* (2013.01); *B32B 2367/00* (2013.01); *B32B 2605/10* (2013.01)

(58) Field of Classification Search
  CPC ...... B61D 17/10; B61D 17/12; B61D 19/005; B61D 19/006; B61D 19/007; B61D 19/008; B61D 19/009; B32B 3/12; B32B 37/146; B32B 2307/3065; B32B 2605/10; B29C 70/34; B29C 70/44; B29C 70/46; E05D 15/0652; E05D 15/06; B61C 17/04; B29L 2031/608
  See application file for complete search history.

(56) References Cited

U.S. PATENT DOCUMENTS

2010/0140975 A1\* 6/2010 Cho .................... B62D 29/001
                                                    296/178
2017/0240188 A1\* 8/2017 Claudel ............... B61D 17/005

\* cited by examiner

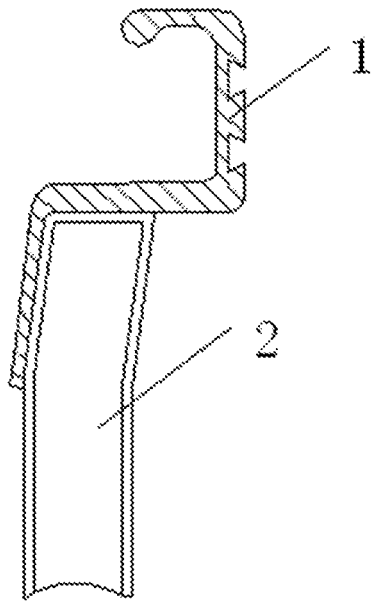
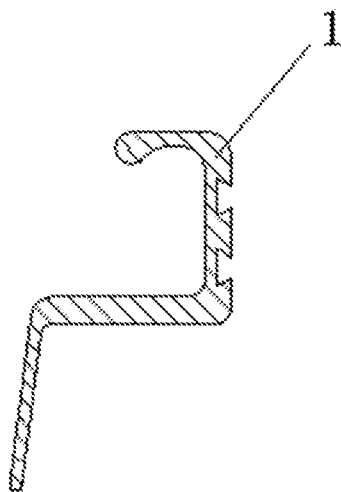
Fig. 3-1    Fig. 3-2
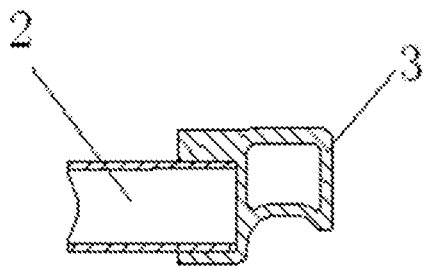
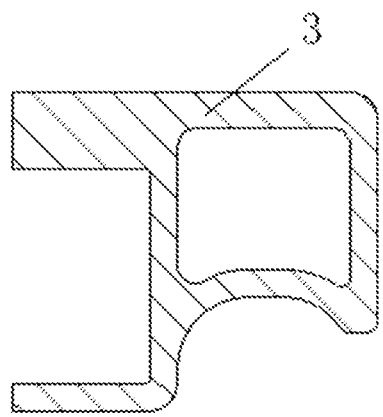
Fig. 4-1    Fig. 4-2

PROCESS FOR MANUFACTURING BASE BOARD OF HIGH-SPEED RAIL EQUIPMENT CABIN USING COMPOSITE MATERIAL

CROSS REFERENCE OF RELATED APPLICATION

This is a U.S. National Stage under 35 U.S.C 371 of the International Application PCT/CN2016/096336, filed Aug. 23, 2016, which claims priority under 35 U.S.C. 119(a-d) to CN 201510947269.5, filed Dec. 16, 2015.

BACKGROUND OF THE PRESENT INVENTION

Field of Invention

The present invention relates to a process for manufacturing a base board of a high-speed rail equipment cabin, and more particularly to a process for manufacturing a base board of a high-speed rail equipment cabin using a composite material with high strength and light weight.

Description of Related Arts

The base board of high-speed rail equipment cabin is an important part of the equipment cabin of standard high-speed train. In practical application, lamination design, material usage and technique design are considered since there are certain requirements on bearing ability, flame retardant ability and impact resistant ability of the base board; along with the constant update of science and technology, light weight and smooth-going design are used to effectively reduce the resistance of the train during operation, thereby reducing the continuous energy consumption. Under the condition of ensuring comprehensive performance, using of composite materials instead of aluminum alloy materials can reduce the weight of the overall train and enhance the level of light weight performance of the overall train.

SUMMARY OF THE PRESENT INVENTION

In view of the above problems, a main object of the present invention is to provide a process for manufacturing a base board of a high-speed rail equipment cabin using a composite material with high strength and light weight.

The present invention solves the above technical problems by the following technical solutions: a process for manufacturing a base board of a high-speed rail equipment cabin using a composite material, wherein the composite material includes:

aramid fiber honeycomb, PET (Polyethylene terephthalate) foam, 3K twill carbon fiber flame retardant prepreg, unidirectional carbon fiber flame retardant prepreg, glass fiber flame retardant prepreg, aramid flame retardant prepreg, and 300 g/m$^2$ single component medium temperature curing blue epoxy adhesive;

the process for manufacturing the base board of the high-speed rail equipment cabin using the composite material includes steps of:

(1) manufacturing a base-board main plate;
(2) manufacturing a base-board handle;
(3) manufacturing base-board sliders, wherein an amount of the base-board sliders is two; and
(4) obtaining the base board through the base-board main plate, the base-board handle and the base-board sliders, wherein the base-board handle is stuck to one side of the base-board main plate, and the two base-board sliders are respectively stuck to another two opposite sides of the base-board main plate.

In a specific embodiment of the present invention, the step of manufacturing the base-board main plate includes closely pasting multiple layers of raw materials to a mold cavity in sequence from outside to inside in a form of lamination, wherein the multiple layers of raw materials are:

1 layer of 198-200 g/m$^2$ 3K twill carbon fiber flame retardant prepreg;
5-8 layers of 300-315 g/m$^2$ glass fiber flame retardant prepreg;
2 layers of 235-240 g/m$^2$ aramid flame retardant prepreg;
2 layers of 100-150 g/m$^2$ unidirectional carbon fiber flame retardant prepreg;
1 layer 300 g/m$^2$ single component medium temperature curing blue epoxy adhesive;
2 layers of the 100-150 g/m$^2$ unidirectional carbon fiber flame retardant prepreg;
1 piece of aramid fiber honeycomb with a thickness of 16.5 mm;
1 layer of the 300 g/m$^2$ single component medium temperature curing blue epoxy adhesive;
2 layers of the 100-150 g/m$^2$ unidirectional carbon fiber flame retardant prepreg;
5-8 layers of the 300-315 g/m$^2$ glass fiber flame retardant prepreg; and
1 layer of the 198-200 g/m$^2$ 3K twill carbon fiber flame retardant prepreg, and then shaping the base-board main plate through a hot press machine with a temperature of 130-150° C., a molding time of 3600-3800 s and a pressure of 4 MPa-6 MPa.

In a specific embodiment of the present invention, the step of manufacturing the base-board handle includes: pasting 20-25 layers of 150 g/m$^2$ unidirectional carbon fiber flame retardant prepreg to a mold cavity, and then shaping through vacuum bagging with a temperature of 130-150° C. and a molding time of 4500-4800 s.

In a specific embodiment of the present invention, the step of manufacturing the base-board sliders includes: wrapping 20-25 layers of 150 g/m$^2$ unidirectional carbon fiber flame retardant prepreg around PET foam, and then shaping through a hot press machine with a temperature of 130-150° C., a molding time of 3600-3800 s, and a pressure of 2 MPa-3 MPa.

In a specific embodiment of the present invention, a density of the aramid fiber honeycomb is in a range of 48-50 kg/m$^3$.

In a specific embodiment of the present invention, a density of the PET foam is in a range of 59-61 kg/m$^3$.

The positive and progressive results of the present invention are as follows.

The process for manufacturing the base board of the high-speed rail equipment cabin using the composite material has the following advantages:

(1) By lamination design of the present invention, the base board obtains very high strength at all angles, and the added aramid design gains high impact resistance.

(2) The mold pressing technique is applied to the base-board main plate and the base-board sliders, and the vacuum bagging technique is applied to the base-board handle. These two different techniques are adapted for different product parts.

(3) Through the hot pressing technique, the resin is low in content, which greatly reduces the weight of the base-board main plate.

(4) The present invention brings not only elegant and nice appearance but also strong performance. The weight of the base board made from the composite material is 35%-40% lower than the base board made from the aluminum alloy material, which leads to a good prospect of application.

BRIEF DESCRIPTION OF THE DRAWINGS

FIG. 3-1 is a structural diagram, which shows connection between the base-board handle and the base-board main plate provided by the invention.

FIG. 3-2 is a sectional view of the base-board handle provided by the present invention.

FIG. 4-1 is a structural diagram, which shows connection between the base-board sliders and the base-board main plate provided by the present invention.

FIG. 4-2 is a sectional view of the slider provided by the present invention.

DETAILED DESCRIPTION OF THE PREFERRED EMBODIMENT

Some preferred embodiments are described with accompanying drawings to explain technical solutions of the present invention in detail as follows.

The present invention provides a process for manufacturing a base board of a high-speed rail equipment cabin using a composite material, wherein the composite material includes:

aramid fiber honeycomb, PET (Polyethylene terephthalate) foam, 3K twill carbon fiber flame retardant prepreg, unidirectional carbon fiber flame retardant prepreg, glass fiber flame retardant prepreg, aramid flame retardant prepreg, and 300 g/m² single component medium temperature curing blue epoxy adhesive;

the process for manufacturing the base board of the high-speed rail equipment cabin using the composite material includes steps of:

(1) manufacturing a base-board main plate 1;
(2) manufacturing a base-board handle 2;
(3) manufacturing base-board sliders 3, where an amount of the base-board sliders 3 is two; and
(4) obtaining the base board through the base-board main plate 1, the base-board handle 2 and the two base-board sliders 3.

Figure 1:
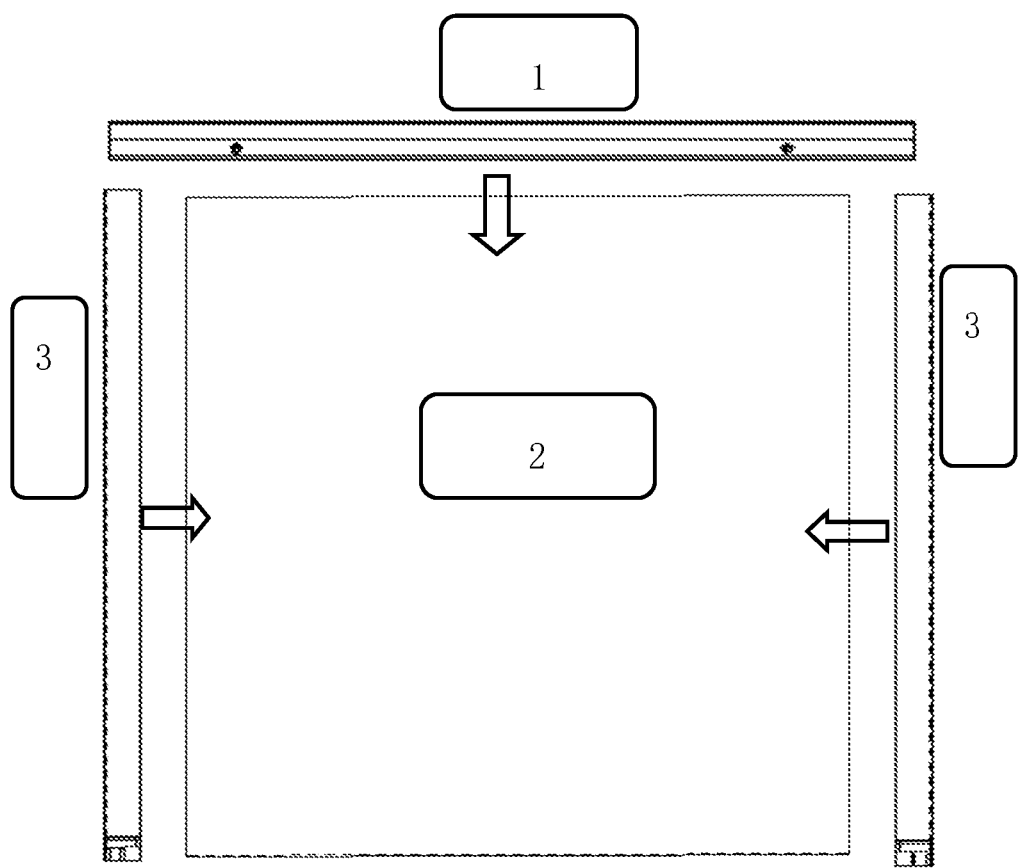
FIG. 1 is an assembly resolution diagram of a base board provided by the present invention.
Figure 2:
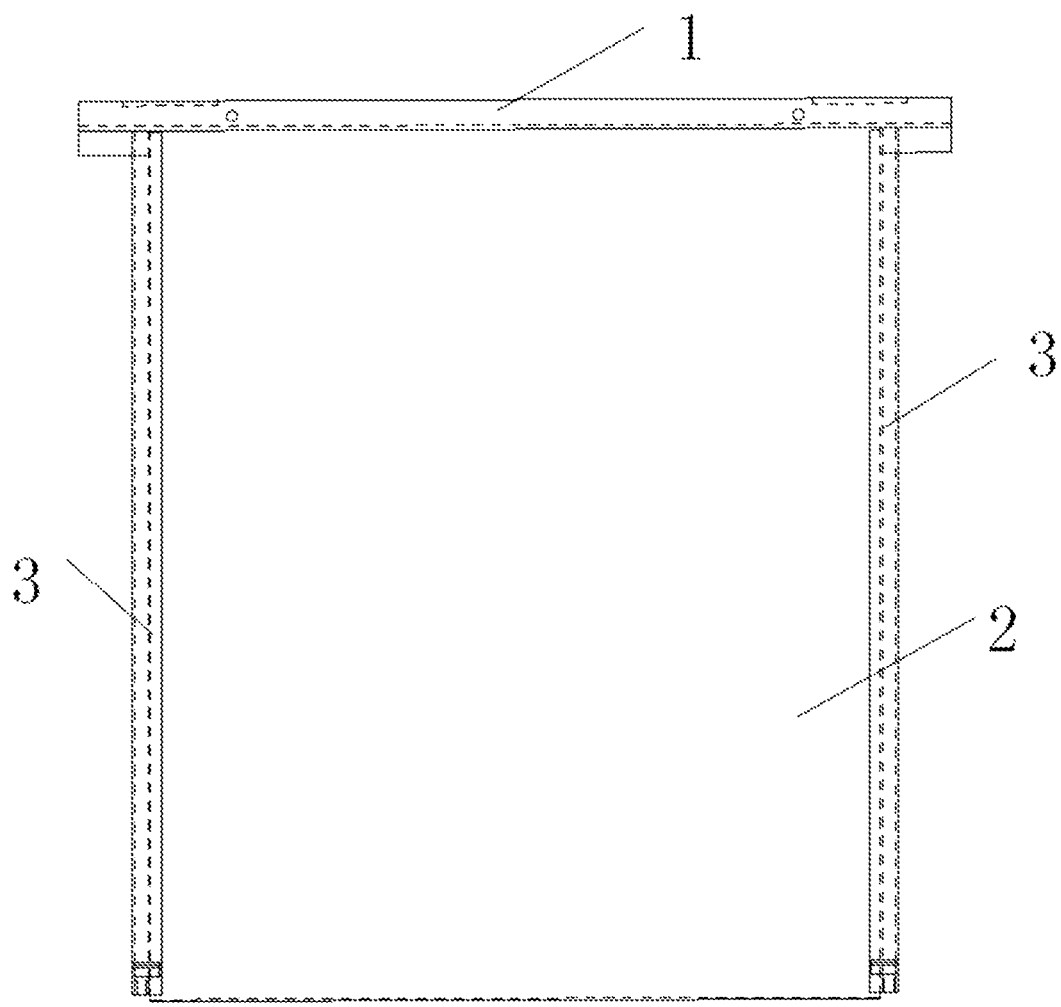
FIG. 2 is an assembly diagram of the base board provided by the present invention.

FIG. 1 is an assembly resolution diagram of the base board provided by the present invention, and FIG. 2 is an assembly diagram of the base board provided by the present invention. While installation, the base-board handle is stuck to one side of the base-board main plate, and the two base-board sliders are respectively stuck to another two opposite sides of the base-board main plate.

FIG. 3-1 is a structural diagram, which shows the connection between the base-board handle and the base-board main plate, FIG. 3-2 is a sectional view of the base-board handle provided by the present invention, FIG. 4-1 is a structural diagram, which shows the connection between the base-board sliders and the base-board main plate provided by the present invention, FIG. 4-2 is a sectional view of the slider provide by the present invention.

In the present invention, the step of manufacturing the base-board main plate includes closely pasting multiple layers of raw materials to a mold cavity, wherein the multiple layers of raw materials are:

1 layer of 198-200 g/m² 3K twill carbon fiber flame retardant prepreg;

5-8 layers of 300-315 g/m² glass fiber flame retardant prepreg;

2 layers of 235-240 g/m² aramid flame retardant prepreg;

2 layers of 100-150 g/m² unidirectional carbon fiber flame retardant prepreg;

1 layer of 300 g/m² single component medium temperature curing blue epoxy adhesive;

2 layers of the 100-150 g/m² unidirectional carbon fiber flame retardant prepreg;

1 piece of aramid fiber honeycomb with a thickness of 16.5 mm;

1 layer of the 300 g/m² single component medium temperature curing blue epoxy adhesive;

2 layers of the 100-150 g/m² unidirectional carbon fiber flame retardant prepreg;

5-8 layers of the 300-315 g/m² glass fiber flame retardant prepreg; and 1 layer of 198-200 g/m² 3K twill carbon fiber flame retardant prepreg, and then shaping the base-board main plate through a hot press machine with a temperature of 130-150° C., a molding time of 3600-3800 s and a pressure of 4 MPa-6 MPa.

In the present invention, the step of manufacturing the base-board handle includes pasting 20-25 layers of 150 g/m² unidirectional carbon fiber flame retardant prepreg to a mold cavity, and then shaping through vacuum bagging with a temperature of 130-150° C. and a molding time of 4500-4800 s.

In the present invention, the step of manufacturing the base-board sliders includes wrapping 20-25 layers of 100-150 g/m² unidirectional carbon fiber flame retardant prepreg around PET foam, and then shaping through a hot press machine with a temperature of 130-150° C., a molding time of 3600-3800 s, and a pressure of 2 MPa-3 MPa.

A density of the aramid fiber honeycomb is in a range of 48-50 kg/m³.

A density of the PET foam is in a range of 59-61 kg/m³.

The present invention is further explained with accompanying embodiments.

First Embodiment

Step one: The manufacturing of a base-board main plate with mold pressing technique:

According to lamination design, one layer of 200 g/m² 3K twill carbon fiber flame retardant prepreg, six layers of 300 g/m² glass fiber flame retardant prepreg, three layers of 235 g/m² aramid retardant prepreg, two layers of 150 g/m² unidirectional carbon fiber flame retardant prepreg, one layer of 300 g/m² single component medium temperature curing blue epoxy adhesive, two layers of 150 g/m² unidirectional carbon fiber flame retardant prepreg, one piece of aramid fiber honeycomb with a thickness of 16.5 mm, one layer of 300 g/m² single component medium temperature curing blue epoxy adhesive, two layers of 100-150 g/m² unidirectional carbon fiber flame retardant prepreg, four layers of 300 g/m² glass fiber flame retardant prepreg, and one layer of 200 g/m² 3k twill carbon fiber flame retardant prepreg are laminated in sequence from outside to inside; all layers are pasted to a mold cavity closely with a temperature of 130° C., a molding time of 3600 s and a pressure of 4

MPa. (Letter K in the name of 3K twill carbon fiber means the type of carbon fiber yarn, 1K is used to refer to 1000 single yarn as one tow, 2K is 2000, 3K is 3000)

Step two: The manufacturing of a base-board handle adopts the full-carbon fiber structure, and the base-board handle is shaped through vacuum bagging with a temperature of 130° C., and a molding time of 4600 s.

Step three: The manufacturing of base-board sliders includes wrapping 20 layers of 150 g/m² unidirectional carbon fiber flame retardant prepreg around PET foam, and then shaping through a hot press machine with a temperature of 130° C., a molding time of 3600 s, and a pressure of 2 MPa.

Step four: The performing of CNC (Computer numerical control) engraving, and gluing the base-board main plate, the base-board handle and the base-board sliders.

Step five: Weighing, wherein a weight of the base board made from the composite material 39% less than a weight of a base board of a real high-speed rail made from an aluminum alloy material, a loading capacity of the base board made from the composite material is over 2500 Pa per unit area.

Second Embodiment

Step one: The manufacturing of a base-board main board with mold pressing technique:

According to lamination design, 1 layer of 200 g/m² 3K twill carbon fiber flame retardant prepreg, 7 layers of 300 g/m² glass fiber flame retardant prepreg, 2 layers of 235 g/m² aramid retardant prepreg, 2 layers of 150 g/m² unidirectional carbon fiber flame retardant prepreg, 1 layer of 300 g/m² single component medium temperature curing blue epoxy adhesive, 2 layers of 150 g/m² unidirectional carbon fiber flame retardant prepreg, 1 piece of aramid fiber honeycomb with a thickness of 16.5 mm, 1 layer of 300 g/m² single component medium temperature curing blue epoxy adhesive, 2 layers of 100-150 g/m² unidirectional carbon fiber flame retardant prepreg, 4 layers of 300 g/m² glass fiber flame retardant prepreg, and 1 layer of 200 g/m² 3K twill carbon fiber flame retardant prepreg are laminated in sequence from outside to inside, all layers are pasted to a mold cavity closely with a temperature of 140° C., a molding time of 3600 s and a pressure of 4 MPa.

Step two: The manufacturing of a base-board handle adopts a full-carbon fiber structure, and the base-board handle is shaped through vacuum bagging with a temperature of 140° C. and a molding time of 4600 s.

Step three: The manufacturing of base-board sliders includes wrapping 20 layers of 150 g/m² unidirectional carbon fiber flame retardant prepreg around PET foam, and then shaping through a hot press machine with a temperature of 140° C., a molding time of 3600 s, and a pressure of 2 MPa.

Step four: The performing of CNC (Computer numerical control) engraving, and gluing the base-board main plate, the base-board handle and the base-board sliders.

Step five: Weighing, wherein a weight of the base board made from the composite material is 37% less than the base board made from an aluminum alloy material of a real high-speed rail, and a loading capacity is over 2500 Pa per unit area.

Third Embodiment

Step one: The manufacturing of a base-board main plate with mold pressing technique:

According to lamination design, 1 layer of 200 g/m² 3K twill carbon fiber flame retardant prepreg, 6 layers of 300 g/m² glass fiber flame retardant prepreg, 3 layers of 235 g/m² aramid retardant prepreg, 2 layers of 150 g/m² unidirectional carbon fiber flame retardant prepreg, 1 layer of 300 g/m² single component medium temperature curing blue epoxy adhesive, 2 layers of 150 g/m² unidirectional carbon fiber flame retardant prepreg, 1 piece of aramid fiber honeycomb with a thickness of 16.5 mm, 1 layer of 300 g/m² single component medium temperature curing blue epoxy adhesive, 2 layers of 100-150 g/m² unidirectional carbon fiber flame retardant prepreg, 4 layers of 300 g/m² glass fiber flame retardant prepreg, 1 layer of 200 g/m² 3K twill carbon fiber flame retardant prepreg are laminated in sequence from outside to inside, all layers are pasted to a mold cavity closely with a temperature of 150° C., a molding time of 3600 s and a pressure of 4 MPa.

Step two: The manufacturing of a base-board handle adopts a full-carbon fiber structure, and the base-board handle is shaped through vacuum bagging with a temperature of 150° C. and a molding time of 4600 s.

Step three: The manufacturing of base-board sliders includes wrapping 20 layers of 150 g/m² unidirectional carbon fiber flame retardant prepreg around PET foam, and then shaping through a hot press machine with a temperature of 150° C., a molding time of 3600 s and a pressure of 2 MPa.

Step four: The performing of CNC (Computer numerical control) engraving, and gluing the base-board main plate, the base-board handle and the base-board sliders.

Step five: Weighing, wherein a weight of the base board made from the composite material is 39% less than a weight of the base board made from the aluminum alloy material of a real high-speed rail, and a loading capacity is over 2500 Pa per unit area.

The basic principle, main features and advantages of the present invention have been shown and described above. It should be understood by those skilled in the art that the present invention is not limited by the foregoing embodiments. The foregoing embodiments and descriptions describe only the principle of the present invention. Without departing from the spirit and scope of the present invention, the present invention also has various changes and modifications which fall within the scope of the claimed invention. The scope of the present invention is defined by the appended claims and their equivalents.

What is claimed is:

1. A process for manufacturing a base board of a high-speed rail equipment cabin using a composite material, wherein:
   the composite material comprises:
   aramid fiber honeycomb, PET (Polyethylene terephthalate) foam, 3K twill carbon fiber flame retardant prepreg, unidirectional carbon fiber flame retardant prepreg, glass fiber flame retardant prepreg, aramid flame retardant prepreg, and 300 g/m² single component curable blue epoxy adhesive;
   the process for manufacturing the base board of the high-speed rail equipment cabin using the composite material comprises steps of:
   (1) manufacturing a base-board main plate;
   (2) manufacturing a base-board handle;
   (3) manufacturing base-board sliders, wherein an amount of the base-board sliders is two; and (4) obtaining the base board of the high-speed rail equipment cabin through the base-board main plate, the base-board handle and the two base-board sliders, wherein:

the base-board handle is stuck to one side of the base-board main plate and the base-board sliders are respectively stuck to another two opposite sides of the base-board main plate.

2. The process for manufacturing the base board of the high-speed rail equipment cabin using the composite material, as recited in claim 1, wherein the step of manufacturing the base-board main plate comprises:

closely pasting multiple layers of raw materials to a mold cavity in sequence form outside to inside in form of lamination, wherein the multiple layers of raw materials are:

1 layer of 198-200 $g/m^2$ 3K twill carbon fiber flame retardant prepreg;

5-8 layers of 300-315 $g/m^2$ glass fiber flame retardant prepreg;

2 layers of 235-240 $g/m^2$ aramid flame retardant prepreg;

2 layers of 100-150 $g/m^2$ unidirectional carbon fiber flame retardant prepreg;

1 layer of 300 $g/m^2$ single component curable blue epoxy adhesive;

2 layers of the 100-150 $g/m^2$ unidirectional carbon fiber flame retardant prepreg;

1 piece of aramid fiber honeycomb with a thickness of 16.5 mm;

1 layer of the 300 $g/m^2$ single component curable blue epoxy adhesive;

2 layers of the 100-150 $g/m^2$ unidirectional carbon fiber flame retardant prepreg;

5-8 layers of the 300-315 $g/m^2$ glass fiber flame retardant prepreg; and 1 layer of 198-200 $g/m^2$ 3K twill carbon fiber flame retardant prepreg, and then shaping through a hot press machine with a temperature of 130-150° C., a molding time of 3600-3800 s, and a pressure of 4 MPa-6 MPa.

3. The process for manufacturing the base board of the high-speed rail equipment cabin using the composite material, as recited in claim 1, wherein:

the step of manufacturing the base-board handle comprises closely pasting 20-25 layers of 150 $g/m^2$ unidirectional carbon fiber flame retardant prepreg to a mold cavity, and then shaping through vacuum bagging with a temperature of 130-150° C. and a molding time of 4500-4800 s.

4. The process for manufacturing the base board of the high-speed rail equipment cabin using the composite material, as recited in claim 1, wherein:

the step of manufacturing the base-board sliders comprises wrapping 20-25 layers of 150 $g/m^2$ unidirectional carbon fiber flame retardant prepreg around PET foam, and then shaping through a hot press machine with a temperature of 130-150° C., a molding time of 3600-3800 s and a pressure of 2 MPa-3 MPa.

5. The process for manufacturing the base board of the high-speed rail equipment cabin using the composite material, as recited in claim 1, wherein:

a density of the aramid fiber honeycomb is in a range of 48-50 $kg/m^3$.

6. The process for manufacturing the base board of the high-speed rail equipment cabin using the composite material, as recited in claim 1, wherein:

a density of the PET foam is in a range of 59-61 $kg/m^3$.

* * * * *